United States Patent Office 3,823,126
Patented July 9, 1974

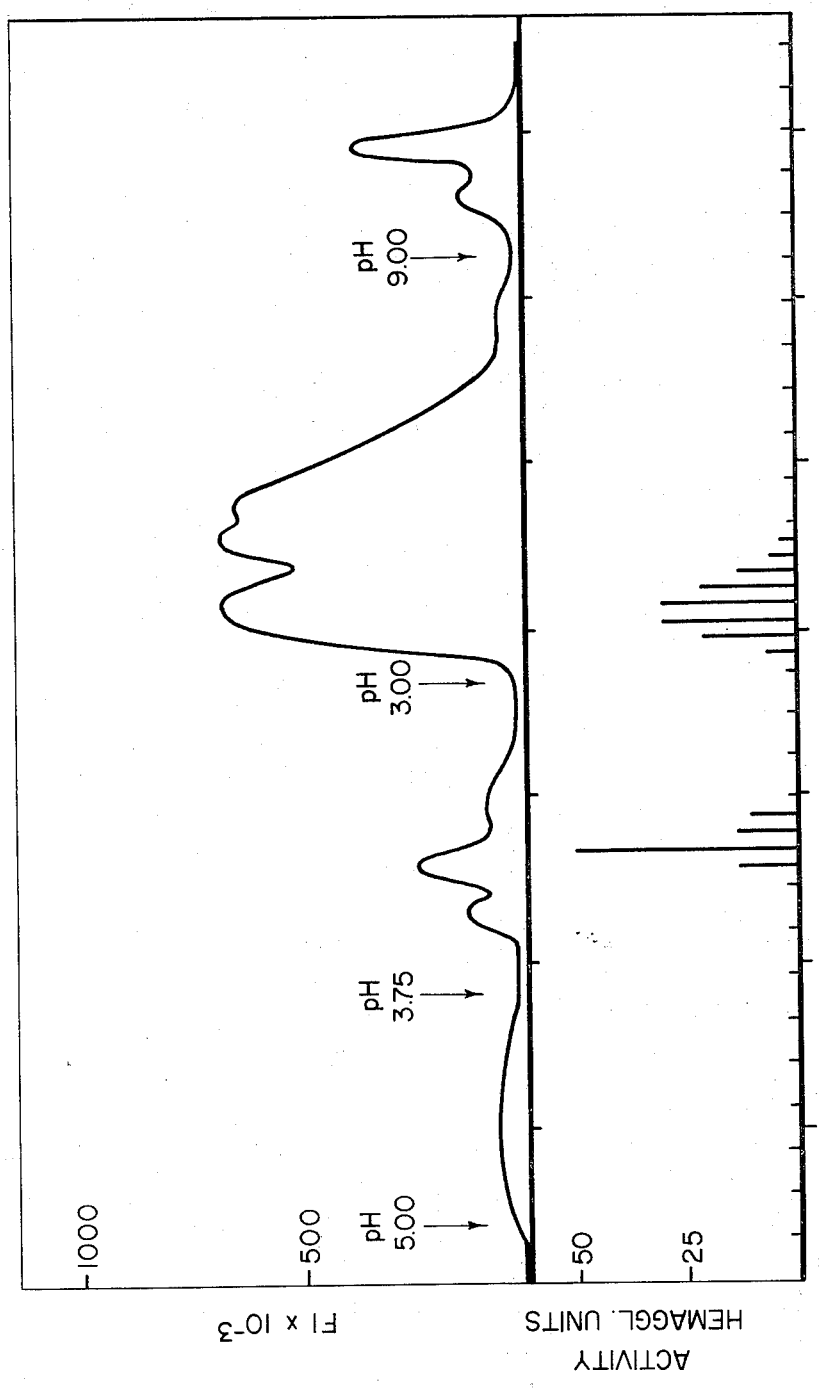

3,823,126
PROCESS OF SEPARATING HUMAN CANCER
ANTIGEN PROTEINS BY GEL FILTRATION
Knut Bertil Bjorklund, Appelviksvagen 26,
S-161-36 Bromma, Sweden
Filed May 23, 1972, Ser. No. 255,975
Int. Cl. C07g 7/00
U.S. Cl. 260—112 R                                 4 Claims

ABSTRACT OF THE DISCLOSURE

The invention refers to a process for separating delicate biological substances. Starting from isoelectric precipitates of protein mixtures the process is based on repeated gradient elution and reprecipitation of the individual components of the mixture. The process is carried out in a gel column with properties such as to permit separation of precipitate, solute and ionic gradient.

---

The present invention relates to a process of separating delicate biological substances starting from a mixture thereof. Particularly, the invention resides in a method of separating proteins without damaging the protein or proteins, while recovering the desired component of the mixture in a pure state.

Accordingly, the main object of the invention is to provide a process of separating proteins starting from a mixture thereof.

A further object of the invention is to provide a separation procedure, by which cancer antigen may be isolated from cancer tissue while obtaining a manifold increase of specific activity. Other objects and advantages of the invention will be clear from the following description.

In principal, the process of this invention comprises the following steps: A mixture of proteins or conjugated proteins is precipitated by isoelectric adjustment of pH. The precipitate hereby obtained is mixed with a suitable gel selected while considering the protein mixture at hand. The resulting mixture of precipitate and gel is layered on top of a column containing an identical gel of the same isoelectric pH. The column is then subjected to elution under gradually increasing or decreasing pH. In the eluate the fraction or fractions recovered are those containing the desired protein or proteins. Although the process of the invention is not to be bound by any particular theory it is believed that the separation of molecular species of the protein mixture can be explained in the following way:

The precipitated proteins are exposed to a flow of ions which brings one protein after another in solution. The time required for solubilization of the various proteins will depend on the ionic strength, pH, temperature, and the flow rate. Since the distribution coefficient of each dissolved protein is lower than that of the ionic gradient, the protein will travel faster in the gel than will the gradient. In consequence, the protein will reprecipitate and become stationary until redissolved by the approaching ionic front. This process repeats itself an indefinite number of times, thus affecting separation of molecular species differing only slightly from each other.

The invention will be further illustrated by the following example intended to illustrate but not to limit the scope of the invention.

Example

A salt-free solution in $H_2O$ of 15 mg. of a purified, human cancer tissue extract [reference: Bjorklund, "Systematic Antigenic Change in Human Carcinoma Tissues by Hemagglutination Techniques," Int. Arch. Allergy 36, 191–203 (1969)], representing 1580 hemagglutinating units, was precipitated by the addition of 0.1 m. HCOOH until the pH reached 5.0. The opaque mixture was combined with 10 ml. of Bio-Gel P-2 (Bio-Rad) slurry which had been equilibrated with 0.02 M $HCOOH/HCOONH_4$ at pH 5.0. This mixture was placed on top of 15 ml. of identical gel in a silicone-treated glass column having an inner diameter of 16 mm. and a length of 150 mm.

Elution was carried out with 70 ml. of 0.02 M $HCOOH/HCOONH_4$ at pH 5.0 at a flow rate of 43 ml./hr. After the appearance of the first peak, representing coprecipitated protein, 100 ml. of 0.02 M $HCOOH/HCOONH_4$ at pH 3.75 was employed, and, after the elution of three more peaks, 125 ml. of 0.02 M $HCOOH/HCOONH_4$ at pH 3.00 was passed through the column. This resulted in release of a large fraction, probably consisting of three components. Finally, 100 ml. of 0.05 M $NH_4HCO_3/NH_3$ at pH 9.0 was used to remove two more sharply separated fractions from the column.

An LKB fraction collector with an Uvicord Unit was used to collect and to monitor the eluate. The fluorescence of the fractions were read at 350 nm. in an Aminco fluorescence spectrometer with excitation set at 278 nm. Activity was determined in terms of specific antigenicity by a modified hemagglutination technique with a horse anti-HeLa serum as source of antibody.

In principle, the assay technique employed sheep red cells which were treated at pH 6.8 with tannic acid at a final concentration of 1:50,000 (w./v.) and then labeled at pH 7.5 with antigen fractions at various concentrations. The labeled red cells were then exposed to twofold serial dilutions of antiserum the specificity of which had been accomplshed by absorption with human antigens of a nontumor nature. Positive reactions gave rise to typical hemagglutination patterns.

The yield of protein was 103% by fluorescence spectrometry; 37% of the activity was recovered in the third peak, which represented 2% by weight of the total input of protein—this fraction represented 586 hemagglutinating units or 2000 units/mg. as compared to 100 units/mg. at the start. The residual activity was quantitatively recovered from the major fraction. In the accompanying drawing the elution volume is plotted against the fluorescence of the different fractions as per the upper curve, whereas the lower part of the drawing refers to a plot of activity expressed in hemagglutination units.

An alternative procedure for elution of fractions from the column was also applied. With the aid of a new design of a gradient mixer (Ultrograd, LKB-Medical, Sweden), a preliminary gradient program was set up. After activity measurements on the resulting fractions, a definite gradient program could be made. Repeated runs came out in an almost identical way and a complete separation of the leading active peak was achieved.

While in the above specific example human cancer tissue extract has been subjected to treatment according to the present invention using Bio-Gel P-2 as a gel for the separation with stepwise decrease of pH it will be obvious to those skilled in the art that other protein mixtures may be separated as well while obtaining equal results. Thus, any commercial gel may be used compatible with the molecular sizes of the protein mixture in question and when considering treatment of human cancer tissue extract any commercial equivalents to Bio-Gel P-2 may, of course, be used. As an example there may be mentioned Sephadex G-25 from Pharmacia, Sweden. Generally, gels of the type cross-linked dextranes and of the type polyacrylamides are useful when operating the instant invention.

Various modifications and equivalents will be apparent to those skilled in the art and can be made in the process of the present invention without departing from the spirit of scope thereof, and it is, therefore, to be understood that the invention is to be limited only by the scope of the appended claims.

What is claimed is:

1. A process of separating cancer antigen from human cancer tissue extract, comprising the steps of:
   (a) causing a precipitate to form in a solution of said extract by adjusting the pH of the solution to about 5;
   (b) mixing the resulting precipitate with a gel;
   (c) placing the resulting mixture on top of a column containing an identical gel at the same pH;
   (d) subjecting said column to a plurality of elutions under conditions of gradually increasing or decreasing of the same pH;
   (e) recovering the fraction eluted at a pH between about 5 and about 3.

2. A process of separating cancer antigen from human cancer tissue extract according to claim 1, comprising the steps of:
   (a) causing a precipitate to form in a solution of said extract by adjusting the pH of the solution to about 5;
   (b) mixing the resulting precipitate with a slurry of a gel selected from the group consisting of crosslinked polyacrylamide and crosslinked dextran adjusted to the same pH;
   (c) placing the resulting mixture on top of a column containing a gel selected from the same group and of the same pH;
   (d) eluting the column with a plurality of elutions at gradually decreasing pH's; and
   (e) recovering the fraction eluted between pH about 3.7 and pH about 3.0

3. A process according to claim 1, wherein the elution is carried out with an eluting agent of continuously decreasing pH.

4. A process according to claim 3, wherein the elution is carried out by stepwise decrease of pH.

References Cited

UNITED STATES PATENTS

| | | | |
|---|---|---|---|
| 3,663,684 | 5/1972 | Freedman et al. | 424—1 |
| 3,697,638 | 10/1972 | Hansen | 424—88 |

OTHER REFERENCES

Int. Arch. Allergy, 36, 191–203 (1969), Bjorklund.
Introduction to Modern Biochemistry, 3rd Edition, 1968, p. 59.
The Proteins, Neurath, 1965, pp. 14–20.
General Biochemistry, 1958, Fruton et al., pp. 101–102.

HOWARD E. SCHAIN. Primary Examiner

U.S. Cl. X.R.

424—88

UNITED STATES PATENT OFFICE
CERTIFICATE OF CORRECTION

Patent No. 3,823,126      Dated July 9, 1974

Inventor(s) Knut Bertil Bjorklund

It is certified that error appears in the above-identified patent and that said Letters Patent are hereby corrected as shown below:

Claim 1, Line 10:
(line 3 under (d))

"of the same pH;"   should read:   ---ing pH; and---

Signed and sealed this 7th day of January 1975.

(SEAL)
Attest:

McCOY M. GIBSON JR.
Attesting Officer

C. MARSHALL DANN
Commissioner of Patents